United States Patent Office 3,038,840
Patented June 12, 1962

3,038,840
PROCESS FOR THE PRODUCTION OF ALKALOID DERIVATIVES OF LYSERGIC ACID
Ernst Boris Chain, Cesare Bonino, and Antonio Tonolo, Rome, Italy, assignors to Societa Farmaceutici Italia, a corporation of Italy
No Drawing. Filed July 6, 1960, Ser. No. 41,031
Claims priority, application Italy July 7, 1959
11 Claims. (Cl. 195—81)

The present invention relates to a process for the production of alkaloid derivatives of lysergic acid, by submerged fermentation with new strains of *Claviceps paspali* Stevens and Hall, from which derivatives pure lysergic acid can be obtained in known manner.

Nowadays the alkaloid derivatives of lysergic acid are generally obtained from ergot, that is from natural sclerotia of *Claviceps purpurea* (Fr.) Tul. A. The investigators Stoll et al. (U.S.P. 2,809,920) have recently reported the production of such alkaloids by saprophytic surface culture of a suitable strain of *Claviceps purpurea* (Fr) Tul. isolated from rye. Others (Abe et al.; J. Agric. Chem. Soc. Japan 25, 1952, p. 458; Taber et al.: Canad. J. of Microbiology 4, 1958, p. 611) have described processes for the preparation of alkaloids by saprophytic surface culture of some particular strains of Claviceps. However such alkaloids do not contain lysergic acid in their molecule and are different from those obtained by natural sclerotia of *Claviceps purpurea* (Fr.) Tul.

In all these investigations, carried out over many years, the production of the alkaloids occurs only by saprophytic surface culture after 20–40 days of incubation and besides the unitary production is so low as to be impractical.

More recently, Spruson et al. (Australian P. 34313/58) have described a process for the biosynthetic production of ergot alkaloids by the cultivation of *Claviceps purpurea* Tul., under essentially anaerobic conditions and with a substantial reduction of cell respiration. Such conditions present a number of evident disadvantages.

The process of the present invention facilitates the production of lysergic acid derivatives alkaloids in high yields, through a submerged culture of new strains of Claviceps, under aerobic conditions and stirring, without causing a reduction of the cell respiration. This signifies that the formation of alkaloids of lysergic acid can be carried out by an industrial fermentation.

The organisms employed for the process of the present invention are new strains of *Claviceps paspali* Stevens and Hall. It had been found that the strains *Claviceps paspali* Stevens and Hall, which do not produce the lysergic acid derivatives alkaloids by submerged culture, may be virulented artificially, to give new strains of *Claviceps paspali*, which in turn allow said production.

The artificial virulentation occurred as follows: Strain F. 97 was isolated from sclerotia grown on plants of *Paspalum disticum*, collected at Tivoli (Rome) and identified and classified as *Claviceps paspali* Stevens and Hall. Embryos of Rosen 4 n rye were inoculated, before germination, with the strain F. 97 and then cultivated "in vitro." The new virulented subspecies were isolated from sclerotia obtained on said embryos.

The strains which are used in the process of the present invention and are described as new strains of *Claviceps paspali* Stevens and Hall in this specification and the claims thereof have been filed at the Istituto Superiore di Sanita—Viale Regina Elena 299—Rome (Italy) and denominated by the marks: F–140; F–S13/1; F–237; F–240. The American Type Culture Collection of Washington has assigned to the strains F/s 13/1, F/237, F/240 and F/140 of *Claviceps paspali* ATCC numbers 13892, 13893, 13894 and 13895, respectively.

The process of the invention is therefore one for the production of alkaloid derivatives of lysergic acid which comprises fermenting under aerobic conditions an aqueous nutrient medium containing a source of carbon, nitrogen and mineral salt with a new strain of *Claviceps paspali* Stevens and Hall as hereinbefore defined.

The above-said strains have the following morphological characteristics: the colonies, obtained in agar glucose-potato on Petri dishes, have a diameter of 1.5–3 cm. after 10–15 days of cultivation at 27° C.; they are round, having a continuous border and smooth surface, showing a white-grey aerial mycelium and a brown or dark vegetative mycelium. The aerial mycelium, velvety and somewhat fasciculated, is constituted by either simple or synnematic hyphae, which have a diameter of 3–4µ and septa at a distance of 20–50µ, containing droplets of fat. The vegetative mycelium is a mat of compact hyphae which have changed their original structure in a pseudo-parenchyma with sclerotal structure. In fact the cells have a polygonal form with a diameter of 3–4×10–15µ, being tightly bound and showing a great number of droplets of fat material. The presence of conidia or clamydospores has never been observed. Sporulation has never been obtained even by changing the sources of carbon or nitrogen in the media.

If the colony surface is scratched by a needle the vegetative mycelium, which lies under the aerial mycelium, presents a pink or fleshy color. The above-said characteristics represent a particular feature of these strains, that have never been observed in other strains of Claviceps isolated.

In submerged culture the mycelium forms groups of small round or irregular pellets, having sizes of 0.1–1×0.5–3 cm., somewhat loose, which are constituted by synnemata formed by tightly bound hyphae. The hyphae have a diameter of 3–5µ and are straight with very few lateral branchings. The hyphae contain a great number of droplets of fat, even at the early stages. The mycelium, in submerged culture, may have a yellow, brown, grey-green or green color, according to the different media and to the age.

As regards the production of alkaloid derivatives of lysergic acid, the present invention is not limited to the use of the described strains, but comprises also the mutants thereof, which may be obtained, e.g. by means of either a selection or a mutation by the action of U.V. rays or Roentgen rays or any other mutagenous substance or, particularly, by artificial infection of either embryos or grasses cultivated in vitro or plants of grasses cultivated both in vivo or in vitro and the said mutants are to be included in the definition of a new strain of *Claviceps paspali* Stevens and Hall.

According to our invention the process is preferably carried out by cultivating the above-described organisms, in aerobic conditions and in submerged culture, both in laboratory flasks and in industrial fermentors, in an aqueous nutrient solution which contains: inorganic salts, nitrogen sources and carbohydrates or their suitable compounds acting as carbon sources, until a high yield of alkaloids is obtained.

As regards the inorganic salts, they may be chlorides and/or nitrates and/or carbonates and/or sulphates and/or phosphates of alkaline metals, earth alkaline metals, magnesium, iron, zinc and manganese but preferably $MgSO_4$ and $KH_2PO_4$.

The behavior of the strains described in the present invention when grown in presence of $Fe^{++}$ and $Zn^{++}$ in the medium, is different from that of the strains of *Claviceps purpurea* described by Stoll et al. (U.S.P. 2,809,920). These two elements may decrease the production of alkaloids markedly.

The nitrogen sources may be ammonium salts such as citrate, tartrate, malate, succinate, oxalate, acetate and the like; amino acids and their mixtures, peptides or proteins, their hydrolysates, meat extracts, hydrosoluble fractions of cereal like corn or wheat; corn malt extract, corn-steep liquor, soya-bean meal, peanut meal, chick-pea meal, cotton bean meal.

The carbohydrates may be glucose, sucrose, starch, dextrins, sorbitol, mannitol, lactose and the like.

The cultivation can be accomplished under aerobic conditions, in surface culture or preferably in submerged culture; it may be carried out either in laboratory flasks or in fermentors, under stirring or still conditions and maintaining aerobiosis with air or oxygen. The fermentation is carried out at a temperature from 22° to 30° C., preferably at 27° C. and at pH range from 4.2 to 6, preferably at 5.2. The production of the alkaloids generally starts after two days of culture, reaching the optimum after 7–9 days.

The evaluation of alkaloids content may be effected on the basis of color tests by the van Urk reaction (Pharm. Weekbled 66, 1929, p. 473) after extraction as follows: the culture broth is alkalinized to pH 8 and extracted first with chloroform and then re-extracted with the aqueous acidic solution (e.g. 1% $H_2SO_4$ or 2% tartaric acid) which is used for the colorimetric analysis of alkaloids.

The usual procedures of extraction with suitable organic solvents, such as benzene, chloroform, methylene chloride and the like, or absorption with the known absorbent means, such as charcoal, bentonite and the like, under alkaline conditions, may be used for the separation and isolation of the mixture or the obtained alkaloids. The mixture, in which lysergic acid amide and iso-lysergic acid amide are prevalently present, can then be hydrolyzed with alkali, in known manner, to lysergic and iso-lysergic acid. (J. Chem. Society, 1934, p. 674 and 1936, p. 1440.)

The details of the process of the present invention will be illustrated by the following examples.

*Example 1*

The process is carried out in 500 ml. flasks containing 100 ml. of a suitable nutrient medium. The flasks are shaken by a rotary shaker (200 revolutions/minute; eccentric throw: 10 cm.). The optimal incubation temperature is at 27° C. The relative moisture is 85–90%. The cultivation is carried out in the dark. A flask is inoculated with the mycelium which is obtained from a 10 days culture in potato-glucose-agar of one of the above-described new strains of *Claviceps paspali* Stevens and Hall. The nutrient medium is the following:

| | Percent |
|---|---|
| Mannitol | 5 |
| Succinic acid | 1 |
| $KH_2PO_4$ | 0.1 |
| $MgSO_4 \cdot 7H_2O$ | 0.03 |
| Chick-pea meal | 0.1 |
| Distilled water. | |

The pH is adjusted to 5.2 with aqueous ammonia solution.

A homogeneous culture is generally formed on a rotatory shaker after 7–10 days incubation and it is constituted by a mass of synnematic hyphae. A part, 10%, of such a culture is used as a seed for the prefermentation culture which is carried out in flasks containing the same medium. After 4 days cultivation the fermentation flasks are inoculated with 10% of the mycelium grown in the prefermentation flask.

The fermentation medium for the production of the alkaloids has the following composition:

| | Percent |
|---|---|
| Mannitol | 5 |
| Succinic acid | 3 |
| $KH_2PO_4$ | 0.1 |
| $MgSO_4 \cdot 7H_2O$ | 0.03 |
| Distilled water. | |

The pH is adjusted to 5.2 with aqueous ammonia solution.

In this medium, the average production of alkaloids reaches 1000 μg./ml. after 7–9 days incubation.

Ten liters of culture broth, obtained by 110 fermentating flasks, are filtered and the mycelium is discarded since it contains a very low amount of alkaloids. The filtered dark colored broth (which contains about 1000 μg./ml. of alkaloids) is made alkaline by adding sodium carbonate or sodium hydroxide solution and extracted with 10 lt. of a mixture chloroform-isobutanol (4:1). The organic extract is re-extracted with an aqueous 2% tartaric acid solution. The aqueous acidic solution is then concentrated under vacuum and at 20–40° C. to a small volume (about one-tenth of the original volume). The residual solution is made alkaline, extracted with chloroform and the solvent evaporated. A white crystalline powder is obtained, from which, by alkaline hydrolysis in known manner, lysergic and iso-lysergic acid are obtained.

*Example 2*

The cultivation is carried out with the following nutritive medium:

| | Percent |
|---|---|
| Mannitol | 5 |
| Malic acid | 3 |
| $KH_2PO_4$ | 0.1 |
| $MgSO_4 \cdot 7H_2O$ | 0.03 |
| Distilled water. | |

The pH is adjusted to 5.2 with aqueous ammonia solution.

The fermentation is carried out according to the procedure described in Example 1. After 7–9 days incubation, the production of alkaloids reaches the value of 1000 μg./ml. The same yield is obtained if tartaric acid, citric acid, malic acid, acetic acid, fumaric acid, succinic acid are used.

*Example 3*

The cultivation is carried out with the following nutrient medium:

| | Percent |
|---|---|
| Sorbitol | 5 |
| Malic acid | 3 |
| $KH_2PO_4$ | 0.1 |
| $MgSO_4 \cdot 7H_2O$ | 0.03 |
| Distilled water. | |

The pH is adjusted to 5.2 with aqueous ammonia solution.

The fermentation is carried out according to the procedure described in Example 1. After 7–9 days incubation, the production of alkaloids reaches 1000 μg./ml.

*Example 4*

The cultivation is carried out with the following nutrient medium:

| | Percent |
|---|---|
| Mannitol | 4 |
| Glucose | 1 |
| Succinic acid | 2 |
| $KH_2PO_4$ | 0.1 |
| $MgSO_4 \cdot 7H_2O$ | 0.03 |
| Chick-pea meal | 0.5 |
| Distilled water. | |

The pH is adjusted to 5.2 with aqueous ammonia solution.

The fermentation is carried out according the the procedure described in Example 1. After 7–9 days incubation, the production of alkaloids reaches to 1400–1600 μg./ml.

Other suitable nitrogen sources are: soyabean meal, peanut meal, bean meal, lentil meal, pea meal, potato meal, hydrolyzed casein, yeast extract, corn-steep liquor and the like.

Example 5

The fermentation is carried out in glass fermentors having a ratio $h/D$ not less than 3. Four liters of the following nutrient medium are poured into each fermentor.

| | Percent |
|---|---|
| Mannitol | 5 |
| Succinic acid | 3 |
| $KH_2PO_4$ | 0.1 |
| $MgSO_4 \cdot 7H_2O$ | 0.03 |
| Distilled water. | |

The pH is adjusted to 5.2 with aqueous ammonia solution.

The sterilization is effected in an autoclave for 20 minutes at 100° C. and for 40 minutes at 120° C. The fermentors are aerated from the bottom through a sintered glass sparger. The foam is controlled by adding the usual anti-foaming agents such as Vaseline oil (Vaseline is a registered trademark) containing 6% Alkaterge and the like. The incubation temperature is kept at 27° C.

The inoculum is constituted by 400 ml. of the culture prepared as described in Example 1. After 4–6 days culture, the production of alkaloids reaches the optimum reported in Example 4.

Example 6

The nutrient medium has the following composition:

| | Percent |
|---|---|
| Sorbitol | 5 |
| Succinic acid | 1 |
| $KH_2PO_4$ | 0.1 |
| $MgSO_4 \cdot 7H_2O$ | 0.03 |
| Chick-pea meal | 1 |
| Distilled water. | |

The pH is adjusted to 5.2 with aqueous ammonia solution.

The fermentation is carried out as described in Example 5.

After 4–7 days culture the production of alkaloids reaches the optimum reported in Example 4.

Example 7

The fermentation is carried out in stainless steel fermentors which are four meters high and have a diameter of 0.2 m. 90 lt. of the following nutrient medium are poured into each fermentor:

| | Percent |
|---|---|
| Mannitol | 5 |
| Succinic acid | 1 |
| $KH_2PO_4$ | 0.1 |
| $MgSO_4 \cdot 7H_2O$ | 0.03 |
| Chick-pea meal | 0.1 |
| Distilled water. | |

The pH is adjusted to 5.2 with aqueous ammonia solution.

The sterilization is effected in another suitable container, so that the cultivation liquid does not come into contact with the direct steam. In fact, it has been observed that the smallest traces of iron in the medium cause a decrease of the production of alkaloids. The inoculum is constituted by 9 lt. of a culture prepared as described in Example 1. The air enters from the bottom through a porous sparger (1 volume air/1 volume liquid/1 minute).

After 6–9 days incubation the same high yields of alkaloids reported in Example 4 are obtained.

Example 8

The fermentation is carried out in stainless steel fermentors containing 50 lt. of the following medium:

| | Percent |
|---|---|
| Mannitol | 4 |
| Glucose | 1 |
| Succinic acid | 2 |
| $KH_2PO_4$ | 0.1 |
| $MgSO_4 \cdot 7H_2O$ | 0.03 |
| Distilled water. | |

The pH is adjusted to 5.2 with aqueous ammonia solution.

The fermentation is effected under stirring and aeration. After 6–9 days incubation high yields of alkaloids, as reported in Example 4, are obtained.

We claim:
1. A process for the production of a mixture of lysergic acid and isolysergic acid amide comprising fermenting, under aerobic conditions, an aqueous nutrient medium containing a source of carbon, nitrogen and mineral salt with a new virulented strain of *Claviceps paspali* Stevens and Hall.

2. A process for the production of a mixture of lysergic acid and isolysergic acid amide comprising fermenting by submerged culture, under aerobic conditions, an aqueous nutrient medium containing a source of carbon, nitrogen and mineral salt with a new virulented strain of *Claviceps paspali* Stevens and Hall.

3. A process for the production of a mixture of lysergic acid and isolysergic acid amide comprising fermenting by submerged culture, under aerobic conditions, an aqueous nutrient medium containing a source of carbon, nitrogen and mineral salt with a new strain of *Claviceps paspali* Stevens and Hall, in which the new strain is that strain obtained from *Claviceps paspali*, produced from sclerotia grown on rye embyro, inoculated before germination with *Claviceps paspali* Stevens and Hall and then cultivated in vitro.

4. A process according to claim 3 carried out at a temperature of from 22° to 30° C.

5. A process according to claim 4, in which the nutrient medium has a pH of from 4.2 to 6.

6. A process according to claim 3, in which the mineral salt is constituted by $KH_2PO_4$ and $MgSO_4$.

7. A process according to claim 3, in which the source of nitrogen is at least one member of the group consisting of chick-pea meal, soyabean meal, peanut meal, bean meal, lentil meal, pea meal, potato meal, malt extract, hydrolyzed casein, and corn-steep liquor.

8. A process according to claim 3, in which the source of carbon is a carbohydrate.

9. A process according to claim 8, in which the carbohydrate is at least one member of the group consisting of glucose, sucrose, starch, mannitol, lactose and sorbitol.

10. A process according to claim 3, in which the mixture of lysergic acid and isolysergic acid amide is recovered after fermentation by filtering the medium, rendering the filtrate alkaline and extracting the mixture of lysergic acid and isolysergic acid amide from the medium by extraction with a water immiscible organic solvent.

11. A process according to claim 3, in which the mixture of lysergic acid and isolysergic acid amide is recovered after the fermentation by filtering the medium, rendering the filtrate alkaline and recovering the mixture of lysergic acid and isolysergic acid amide from the medium by adsorption upon a solid adsorbent material.

References Cited in the file of this patent

UNITED STATES PATENTS 2,936,266   Windisch et al. _____ May 10, 1960

OTHER REFERENCES

Condensed Chemical Dictionary, 5th edition, Reinhold Publishing Corp., New York, 1956, p. 668.